United States Patent
Ochi et al.

(10) Patent No.: US 7,610,754 B2
(45) Date of Patent: Nov. 3, 2009

(54) FLUID PRESSURE UNIT AND FLUID PRESSURE UNIT CONTROL METHOD

(75) Inventors: Yoshiyuki Ochi, Osaka (JP); Yoshimitsu Otani, Osaka (JP); Hirokazu Nakamura, Osaka (JP)

(73) Assignee: Daikin Industries, Ltd., Osaka (JP)

( * ) Notice: Subject to any disclaimer, the term of this patent is extended or adjusted under 35 U.S.C. 154(b) by 268 days.

(21) Appl. No.: 11/658,023

(22) PCT Filed: Jan. 19, 2006

(86) PCT No.: PCT/JP2006/300759

§ 371 (c)(1),
(2), (4) Date: Jan. 22, 2007

(87) PCT Pub. No.: WO2006/082711

PCT Pub. Date: Aug. 10, 2006

(65) Prior Publication Data

US 2008/0034956 A1  Feb. 14, 2008

(30) Foreign Application Priority Data

Feb. 3, 2005  (JP) .............................. 2005-027973

(51) Int. Cl.
*F15B 9/00* (2006.01)
*F15B 15/28* (2006.01)
(52) U.S. Cl. .......................................... 60/428; 60/431
(58) Field of Classification Search .................. 60/428, 60/431, 432
See application file for complete search history.

(56) References Cited

U.S. PATENT DOCUMENTS 5,063,740 A * 11/1991 Aihara ........................ 60/432

(Continued)

FOREIGN PATENT DOCUMENTS

EP  0081703 A1  6/1983

(Continued)

OTHER PUBLICATIONS

Shigetosi Shimoo et al., Papers Abstract of Fluid Power System Autumn Conference on Japan Fluid Power System Society on Nov. 18, 2004, "Energy saving and Time Sharing PrIPEoport ona Pressure Control System of NC Lathe".*

(Continued)

*Primary Examiner*—Thomas E Lazo
(74) *Attorney, Agent, or Firm*—Birch, Stewart, Kolasch & Birch LLP

(57) ABSTRACT

In a hydraulic unit (A) including a hydraulic pump configured to be driven by a motor (2) and a hydraulic cylinder (3) for actuating a chuck, a fixed displacement hydraulic pump is combined with an adjustable speed motor (2) for driving the pump. In order to concurrently provide rapid movement of the cylinder (3) and reduction in the surge pressure, upon the cylinder (3) actuating the chuck, after a teaching movement is imparted to the cylinder (3) to determine an operating stroke of the cylinder (3) based on the number of rotations of the motor (2), the motor (2) is rotated at a high rotational speed for movement until a preset deceleration start point short of the end of movement of the cylinder (3) within the determined operating stroke and then rotated at a low rotational speed for deceleration from the deceleration start point to the end of movement of the cylinder (3), thereby allowing the chuck to chuck a work with a soft touch.

10 Claims, 4 Drawing Sheets

U.S. PATENT DOCUMENTS 5,680,761 A * 10/1997 Hada et al. .................... 60/432

FOREIGN PATENT DOCUMENTS

| | | | |
|---|---|---|---|
| JP | 54-031876 A | | 3/1979 |
| JP | 58-102807 A | | 6/1983 |
| JP | 62-098001 A | | 5/1987 |
| JP | 62098001 A | * | 5/1987 |
| JP | 63-074881 A | | 4/1988 |
| JP | 1-172601 A | | 7/1989 |
| JP | 6-007551 A | | 1/1994 |
| JP | 6-292769 A | | 10/1994 |
| JP | 7-237000 A | | 9/1995 |
| JP | 8-26697 A | | 1/1996 |
| JP | 8-309552 A | | 11/1996 |
| JP | 11-327651 A | | 11/1999 |
| JP | 11327651 A | * | 11/1999 |
| JP | 2000-039920 A | | 2/2000 |
| JP | 2000-337316 A | | 12/2000 |
| JP | 2000337316 A | * | 12/2000 |
| JP | 2001-90671 A | | 4/2001 |
| JP | 2002-188602 A | | 7/2002 |
| JP | 2002188602 A | * | 7/2002 |
| JP | 2005-195081 A | | 7/2005 |

OTHER PUBLICATIONS

Shigetosi Shimoo et al., Papers Abstract of Fluid Power System Autumn Conference on Japan Fluid Power System Society on Nov. 18, 2004, "Energy saving and Time Sharing Proportional Pressure Control System of NC lathe".

* cited by examiner

FLUID PRESSURE UNIT AND FLUID PRESSURE UNIT CONTROL METHOD

TECHNICAL FIELD

This invention relates to fluid pressure units equipped with an actuator to which fluid discharged from a fluid pump is supplied and control methods for the fluid pressure units.

BACKGROUND ART

As an example of fluid pressure units of such kind, there is conventionally known one including a fixed displacement hydraulic pump, an adjustable speed motor for driving the hydraulic pump, an actuator, such as a hydraulic cylinder, to which working fluid discharged from the hydraulic pump is supplied through a discharge line, an operating selector valve for selectively providing and interrupting fluid communication into the discharge line between the hydraulic pump and the actuator, a controller for controlling the adjustable speed motor, and a pressure sensor for detecting the pressure of the discharge line for the hydraulic pump (see, for example, Patent Document 1).

The controller is configured to control the rotational speed of the adjustable speed motor so that the pressure of the discharge line detected by the pressure sensor and the flow rate thereof calculated from the rotational speed of the adjustable speed motor can be a pressure and a flow rate both lying on a predetermined target pressure-flow rate curve. In other words, the fluid pressure unit is configured to control by itself the pressure and flow rate of fluid discharged from the hydraulic pump without externally receiving any pressure command signal and flow rate command signal. This eliminates the need to externally input a pressure command signal or a flow rate command signal and dispenses with any input signal line, thereby saving the trouble of the operator inputting commands for the pressure or the flow rate and simplifying the wiring.

Patent Document 1: Unexamined Japanese Patent Publication No. 2001-90671

DISCLOSURE OF THE INVENTION

Problems to Be Solved by the Invention

When the actuator having moved ends the movement, the end of movement induces an abrupt pressure rise to develop a so-called surge pressure. For example, as shown in FIG. 4, where a pressure reducing valve (21) is connected between a hydraulic pump (1) (a fluid pump) and, for example, a hydraulic cylinder (3) serving as an actuator and the pressure reduced by the pressure reducing valve (21) is set as the pressure for controlling the cylinder (3), the set pressure can be changed without any effect on the circuits extending from the pump (1) towards the other actuators. Therefore, the surge pressure at the time the cylinder (3) reaches a stroke end (an movement end position) can be reduced to some degree. In this configuration, however, the pressure loss at the pressure reducing valve (21) reduces the flow rate of fluid passing therethrough during the movement of the cylinder (3), so that a problem arises that even if the cylinder (3) is tried to be moved rapidly, its operating speed cannot be increased.

The cylinder (3) is a chuck cylinder for actuating, for example, a work chuck serving as an object to be actuated and allows the chuck to chuck a work through either extension or retraction of the cylinder (3). In FIG. 4, reference numeral (2) denotes a motor for driving the hydraulic pump. The motor (2) forms an oil pressure supply unit together with the hydraulic pump. Reference numeral (8) denotes a selector valve connected between the pump (1) and the cylinder (3). The selector valve (8) is configured to start the movement (extension or retraction) of the cylinder (3) through the selection of ports of the selector valve (8).

Where the pressure of fluid to be supplied to the cylinder (3) is set using the pressure reducing valve (21), the pressure loss produced at the pressure reducing valve (21) is determined, as shown in FIG. 5, by the PRV set pressure set through the pressure reducing valve (PRV) regardless of the type of the oil pressure supply unit (which is used of a combination of an induction motor and a variable displacement pump and a combination of an adjustable speed motor (2) and a fixed displacement pump (1). If the unit set pressure set through the oil pressure supply unit is increased, the flow rate of fluid passing through the valve during the cylinder movement can be increased with a slight increase in differential pressure. In this case, however, the discharge rate of the unit is set with reference to the flow rate of fluid restricted by the pressure reducing valve (21).

In contrast, as shown in FIG. 6, where the pump (1) is connected to the cylinder (3) only through the selector valve (8) without using the pressure reducing valve (21) and the discharge pressure of the pump (1) (i.e., the unit set pressure) is set as the pressure for controlling the cylinder (3), the operating speed of the cylinder (3) can be increased by increasing the pump discharge pressure. In this configuration, however, it cannot be avoided to increase the surge pressure.

Specifically, where the unit set pressure in the oil pressure supply unit is set as the pressure of fluid to be supplied to the cylinder (3), as shown in FIG. 7, the flow rate of fluid passing through the discharge line during the cylinder movement is increased, at a constant unit set pressure, by an amount corresponding to the pressure loss at the pressure reducing valve (21) that would be otherwise disposed. Since, however, an amount of pressure necessary to move the cylinder (3) itself exists, the flow rate cannot be increased up to the set flow rate. If the unit set pressure is increased to or above a necessary pressure only during movement of the cylinder (3), the flow rate during the movement can be increased up to the set flow rate. However, a corresponding amount of surge pressure is developed at the end of the movement, which leads to the cylinder (3) chucking the work with a pressure exceeding the necessary pressure.

As can be seen from the above, a trade-off relation exists between increasing the operating speed of the actuator and reducing the surge pressure at the end of movement thereof. Therefore, there is a demand to satisfy both the requirements.

The present invention has been made in view of the foregoing points and its object is to satisfy both rapid movement of the actuator and reduction in the surge pressure at the end of movement of the actuator by improving the manner of controlling the fluid pressure unit.

Means for Solving the Problems

To attain the above object, a first solution of the invention is a fluid pressure unit comprising: a fixed displacement fluid pump (1) configured to be driven by an adjustable speed motor (2) to discharge fluid; at least one actuator (3) for actuating an object to be actuated with a pressure of the fluid discharged from the fluid pump (1); and control means (12) for, upon the actuator (3) actuating the object to be actuated, imparting a teaching movement to the actuator (3) to determine an operating range of the actuator (3) based on the number of rotations of the motor (2) and, during subsequent movement of the actuator (3) to actuate the object to be actuated, rotating the motor (2) at a first speed until a preset deceleration start point short of the end of movement of the actuator (3) within the determined operating range and then rotating the motor (2) at a second speed lower than the first speed from the deceleration start point to the end of movement of the actuator (3).

In the first solution, when the actuator (3) actuates the object to be actuated, a teaching movement is imparted to the actuator (3) prior to the subsequent movement of the actuator (3) intended to actuate the object to be actuated. As a result of the teaching movement of the actuator (3), the operating range of the actuator (3) is determined based on the number of rotations of the motor (2). Subsequently, during movement of the actuator (3) to actuate the object to be actuated, the motor (2) rotates at the first speed until the preset deceleration start point short of the end of movement of the actuator (3) within the determined operating range and then rotates at the second speed lower than the first speed from the deceleration start point to the end of movement of the actuator (3). Since thus a teaching movement is previously imparted to the actuator (3) to determine its operating range and after the teaching movement the motor (2) is rotated at the first speed until the deceleration start point short of the end of movement of the actuator (3) within the operating range and then rotated at the second speed from the deceleration start point to the end of movement of the actuator (3), the first speed can be set at a high speed to increase the operating speed of the actuator (3) and the second speed can be set at a low speed to slowly stop the movement of the actuator (3) and thereby reduce the increase in the surge pressure.

A second solution of the invention is a fluid pressure unit comprising: a fixed displacement fluid pump (1) configured to be driven by an adjustable speed motor (2) to discharge fluid; at least one actuator (3) for actuating an object to be actuated with a pressure of the fluid discharged from the fluid pump (1); and control means (12) for, upon the actuator (3) actuating the object to be actuated, rotating the motor (2) at a first speed until a preset deceleration start point short of the end of movement of the actuator (3) within a predetermined operating range of the actuator (3) and then rotating the motor (2) at a second speed lower than the first speed from the deceleration start point to the end of movement of the actuator (3). Further, the control means (12) is configured to effect a learning control for correcting the operating range of the actuator (3) to a small extent when the surge pressure at the end of movement of the actuator (3) is equal to or greater than a set value and correcting the operating range of the actuator (3) to a large extent when the period of time from the deceleration start point to the end of movement of the actuator (3) is equal to or greater than a set value.

In the second solution, when the actuator (3) actuates the object to be actuated, the motor (3) rotates at the first speed until the preset deceleration start point short of the end of movement of the actuator (3) within the operating range of the actuator (3) and then rotates at the second speed lower than the first speed from the deceleration start point to the end of movement of the actuator (3). Then, the operating range of the actuator (3) is corrected based on the surge pressure at the end of movement of the actuator (3) and the period of time from the deceleration start point to the end of movement of the actuator (3). Specifically, the operating range of the actuator (3) is corrected to a small extent if the surge pressure is equal to or greater than a set value, while the operating range of the actuator (3) is corrected to a large extent if the period of time until the end of movement of the actuator (3) is equal to or greater than a set value. Thus, the operating range of the actuator (3) is learned by correction. Therefore, without imparting of a teaching movement to the actuator (3), the first speed can be set at a high speed to increase the operating speed of the actuator (3) and the second speed can be set at a low speed to slowly stop the movement of the actuator (3) and thereby reduce the increase in the surge pressure.

A third solution of the invention is directed to the fluid pressure unit of the first or second solution and characterized in that the object to be actuated is a chuck for chucking a work and the control means (12) is configured to store data on the operating range of the actuator (3) for each of plural types of works and, at every change of the work type, call up the operating range of the actuator (3) for the current work and control the actuator (3) based on the operating range.

In the third solution, data on the operating range of the actuator (3) is stored for each of plural types of works and, at every change of the work type, the operating range of the actuator (3) for the current work is called up and the actuator (3) is controlled based on the operating range. Thus, neither a further teaching nor a further learning control is required as regarding works for which the operating ranges of the actuator (3) are stored through teaching movements or learning controls, thereby further shortening the operating time of the actuator (3) correspondingly.

A fourth solution of the invention is directed to the fluid pressure unit of the second solution and characterized in that the control means (12) is configured to issue a warning when the operating range of the actuator (3) is smaller or greater than the predetermined operating range.

In the fourth solution, when the operating stroke of the actuator (3) is not greater than the lower reference value or not smaller than the upper reference value, a warning indicating it is issued. Therefore, it can be easily recognized that the operating range has exceeded the predetermined range.

A fifth solution of the invention is directed to the fluid pressure unit of the first or second solution and characterized in that the at least one actuator comprises a plurality of actuators.

In the fifth solution, surgeless control can be exercised on the plurality of actuators.

A sixth solution of the invention is directed to the fluid pressure unit of the first or second solution and characterized in that the control means (12) determines the operating range of the actuator (3) from a change towards an increase in the fluid pressure.

In the sixth solution, from the fact that upon the end of movement of the actuator (3) the fluid pressure between the actuator (3) and the pump increases, the operating range of the actuator (3) is determined. Therefore, the operating range of the actuator (3) can be easily determined.

A seventh solution of the invention is directed to the fluid pressure unit of the first or second solution and characterized in that the control means (12) determines the operating range of the actuator (3) from a change towards an increase in the drive current of the motor.

In the seventh solution, from the fact that upon the end of movement of the actuator (3) the load of the motor (2) driving the pump increases to increase the drive current of the motor, the operating range of the actuator (3) is determined. Therefore, the operating range of the actuator (3) can be easily determined.

An eighth solution of the invention is a fluid pressure unit comprising: a fixed displacement fluid pump (1) configured to be driven by an adjustable speed motor (2) to discharge fluid; an actuator (3) for actuating an object to be actuated with a pressure of the fluid discharged from the fluid pump (1); and estimating means (12) for, upon the actuator (3)

actuating the object to be actuated, estimating an operating range of the actuator (3) based on the number of rotations of the motor (2).

In the eighth solution, when the fixed displacement fluid pump (1) is driven by the adjustable speed motor (2) to discharge fluid, the actuator (3) is operated by a pressure of the fluid discharged from the fluid pump (1) to actuate the object to be actuated. In this case, the operating range of the actuator (3) is estimated based on the number of rotations of the motor (2). Therefore, the operating range of the actuator (3) can be easily estimated.

A ninth solution of the invention is directed to a method for controlling a fluid pressure unit including a fixed displacement fluid pump (1) configured to be driven by an adjustable speed motor (2) to discharge fluid and at least one actuator (3) for actuating an object to be actuated with a pressure of the fluid discharged from the fluid pump (1). In this control method, upon the actuator (3) actuating the object to be actuated, a teaching movement is imparted to the actuator (3) to determine an operating range of the actuator (3) based on the number of rotations of the motor (2) and during subsequent movement of the actuator (3) to actuate the object to be actuated, the motor (2) is rotated at a first speed until a preset deceleration start point short of the end of movement of the actuator (3) within the determined operating range and the motor (2) is then rotated at a second speed lower than the first speed from the deceleration start point to the end of movement of the actuator (3).

In the ninth solution, the same behaviors and effects as in the first solution can be performed.

A tenth solution of the invention is directed to a method for controlling a fluid pressure unit including a fixed displacement fluid pump (1) configured to be driven by an adjustable speed motor (2) to discharge fluid and at least one actuator (3) for actuating an object to be actuated with a pressure of the fluid discharged from the fluid pump (1). In this control method, upon the actuator (3) actuating the object to be actuated, the motor (2) is rotated at a first speed until a preset deceleration start point short of the end of movement of the actuator (3) within a predetermined operating range of the actuator (3) and the motor (2) is then rotated at a second speed lower than the first speed from the deceleration start point to the end of movement of the actuator (3). Further, when the surge pressure at the end of movement of the actuator (3) is equal to or greater than a set value, the operating range of the actuator (3) is corrected to a small extent. On the other hand, when the period of time from the deceleration start point to the end of movement of the actuator (3) is equal to or greater than a set value, the operating range of the actuator (3) is corrected to a large extent.

In the tenth solution, the same behaviors and effects as in the second solution can be performed.

Effects of the Invention

According to the first and ninth solutions, upon operating the fluid pressure actuator with a pressure of fluid from the fixed displacement fluid pump driven by the adjustable speed motor to actuate the object to be actuated, a teaching movement is previously imparted to the actuator to determine its operating range from the number of rotations of the motor and during movement of the actuator to actuate the object to be actuated after the teaching movement, the motor is rotated at a high speed until the preset deceleration start point short of the end of movement of the actuator within the operating range thereof and then rotated at a low speed from the deceleration start point to the end of movement of the actuator. This concurrently provides rapid movement of the actuator and reduction in surge pressure.

According to the second and tenth solutions, the motor is rotated at a high speed until the preset deceleration start point short of the end of movement of the actuator within the predetermined operating range thereof and then rotated at a low speed from the deceleration start point to the end of movement of the actuator, and the operating range of the actuator is corrected based on the surge pressure at the end of movement of the actuator and the period of time from the deceleration start point to the end of movement of the actuator. Thus, the operating range of the actuator can be learned by correction. Therefore, without imparting of a teaching movement to the actuator, rapid movement of the actuator and reduction in surge pressure can be concurrently provided.

According to the third solution, where the object to be actuated is a chuck for chucking a work, data on the operating range of the actuator determined through a teaching movement or a learning control is stored for each of plural types of works and the operating range of the actuator for the current work after the type change is called up to control the actuator based on the operating range. Thus, neither a further teaching nor a further learning control is required as regarding works for which the operating ranges of the actuator are stored, thereby further shortening the operating time of the actuator.

According to the fourth solution, since a warning is issued when the operating stroke of the actuator is smaller or greater than the predetermined range, it can be easily recognized that the operating stroke has exceeded the range.

According to the fifth solution, since the actuator comprises a plurality of actuators, surgeless control can be exercised on the plurality of actuators.

According to the sixth solution, since the operating range of the actuator is determined from a change towards an increase in the fluid pressure, the operating range of the actuator can be easily determined.

According to the seventh solution, since the operating range of the actuator is determined from a change towards an increase in the drive current of the motor, the operating range of the actuator can be easily determined.

According to the eighth solution, since the operating range of the actuator during its actuation of the object to be actuated is estimated based on the number of rotations of the adjustable speed motor, the operating range of the actuator can be easily estimated.

Figure 1:
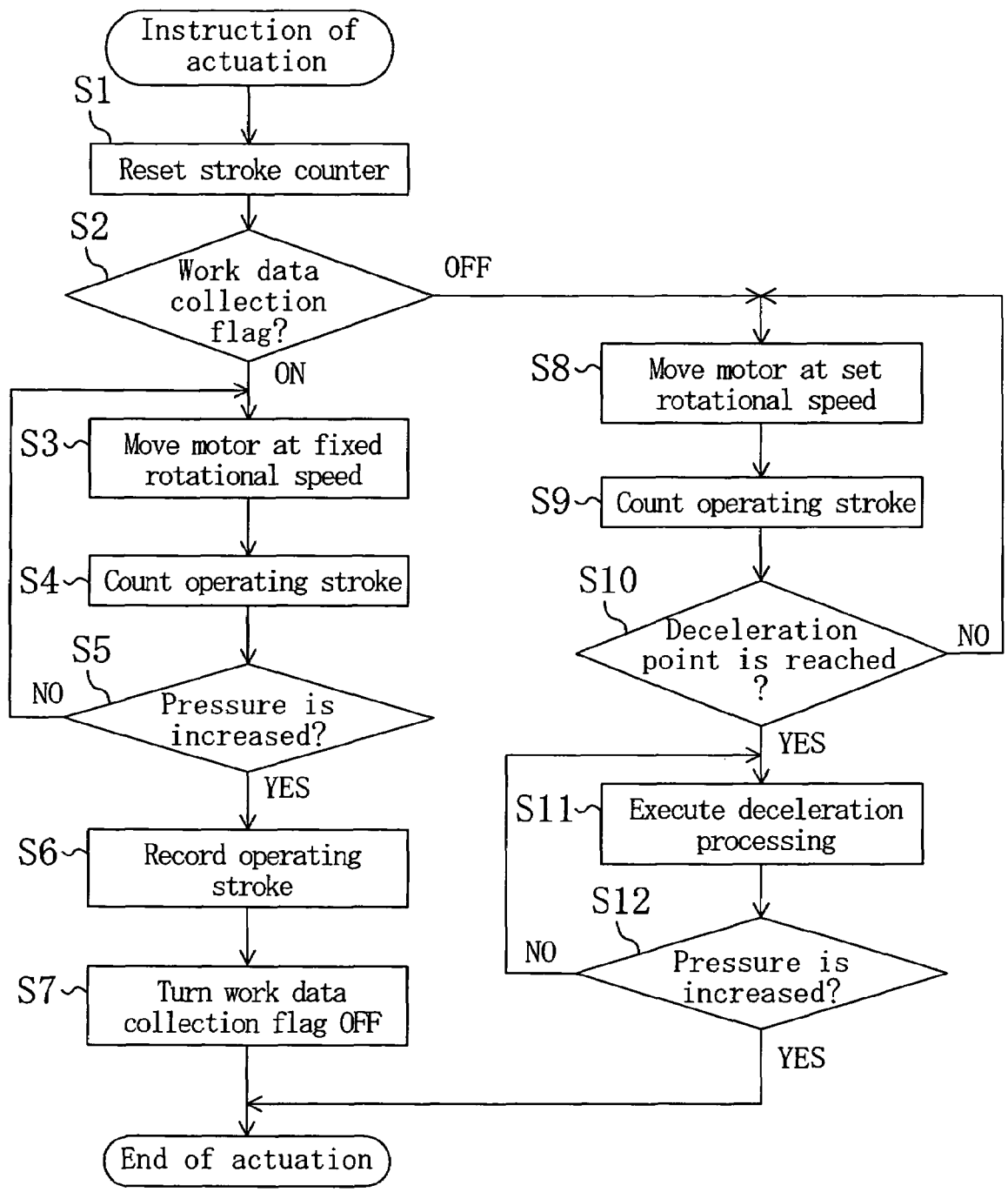
FIG. 1 is a flowchart showing procedures executed by a controller.

EXPLANATION OF REFERENCE CHARACTERS (A) hydraulic unit (fluid pressure unit)
(1) hydraulic pump (fluid pump)
(2) motor
(3) hydraulic cylinder (actuator)
(7) hydraulic passage (fluid passage)
(8) operating selector valve
(12) controller (control means, estimating means)
(13) pressure sensor

BEST MODE FOR CARRYING OUT THE INVENTION

Embodiments of the present invention will be described below in detail with reference to the drawings. The following embodiments, however, are merely illustrative in nature and not intended to limit the scope, applications and use of the invention.

Figure 2:
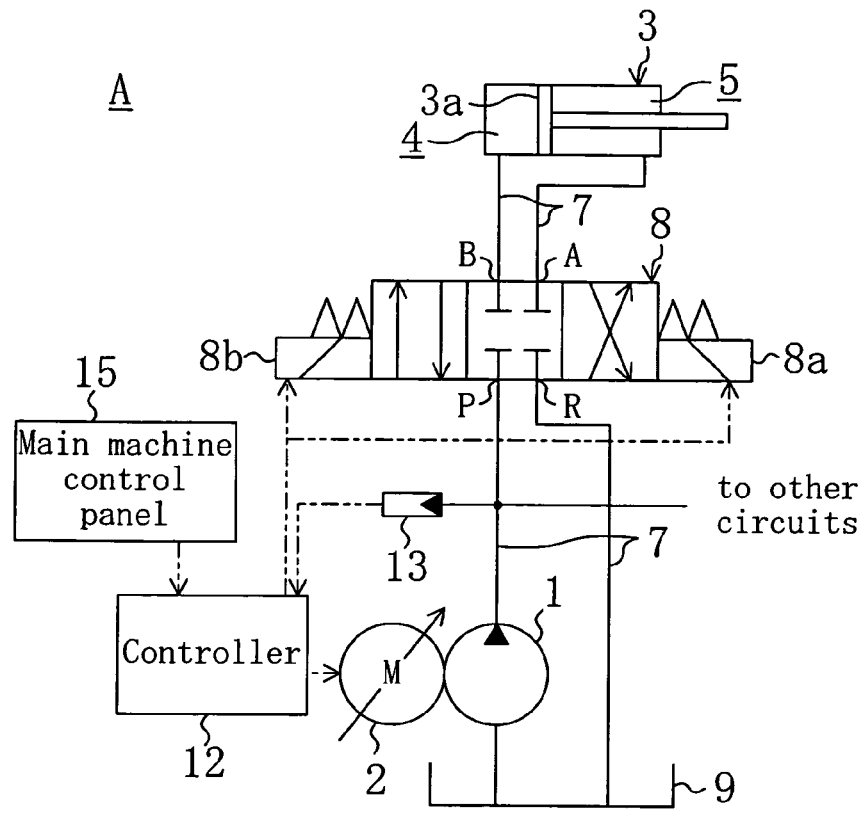
FIG. 2 is a circuit diagram showing the overall configuration of a hydraulic unit according to an embodiment of the present invention.

FIG. 2 shows a hydraulic unit (A) (fluid pressure unit) according to an embodiment of the present invention. The hydraulic unit (A) is used for a machine tool, such as a machining center, which is the main machine for the unit. Though not shown, the machine tool has a plurality of holders (objects to be actuated) for fixing a work or a tool, such as a chuck, a tailstock clamp and a tool post clamp, and these holders are actuated by associated actuators provided in the hydraulic unit (A). Though for convenience of explanation the following description is given only of the operation and control of the actuator for actuating the chuck for chucking a work with reference to FIG. 2, the actuator for actuating a tailstock clamp and the actuator for actuating a tool post clamp are operated and controlled in the same manner.

In FIG. 2, reference numeral (1) denotes a hydraulic pump (fluid pump) for discharging operating oil which is fluid, and reference numeral (2) denotes a motor for driving the hydraulic pump (1). The hydraulic pump (1) is formed of a fixed displacement pump such as a gear pump, a trochoid pump, a vane pump or a piston pump. The motor (2) is formed of an adjustable speed motor such as a switched reluctance motor (SRM) or an interior permanent magnet synchronous motor (IPMSM). A rotational speed control encoder (not shown) built in the adjustable speed motor (2) detects the motor rotational speed corresponding to the discharge rate of the hydraulic pump (1).

Reference numeral (3) denotes a hydraulic cylinder (chuck cylinder) serving as an actuator for the chuck, to which operating oil discharged from the hydraulic pump (1) is supplied. The hydraulic cylinder (3) has a closing chamber (4) and an opening chamber (5) which are partitioned by a piston (3a) and both able to be supplied with operating oil discharged from the hydraulic pump (1). Upon supply of the operating oil to the closing chamber (4), the hydraulic cylinder (3) extends to make a closing operation for closing the chuck. On the other hand, upon supply of the operating oil to the opening chamber (5), the hydraulic cylinder (3), unlike the closing operation, retracts to make an opening operation for opening the chuck. The chuck has a closing motion using mode in which it chucks a work from the outside when closed and an opening motion using mode in which it chucks a work from the inside when opened. The hydraulic cylinder (3) is used in both the two using modes. Specifically, in the closing motion using mode, the closing operation of the hydraulic cylinder (3) allows the chuck to chuck a work from the outside, while in the opening motion using mode, the opening operation of the hydraulic cylinder (3) allows the chuck to chuck a work from the inside.

The closing chamber (4) and the opening chamber (5) of the hydraulic cylinder (3) are connected through hydraulic passages (7) to the discharge part of the hydraulic pump (1) and a tank (9). The hydraulic passages (7) are provided with an operating selector valve (8) for selectively providing and interrupting fluid communication into the hydraulic passages (7). The operating selector valve (8) is formed of a four-port three-position spring-loaded center-guided solenoid selector valve having first and second solenoids (8a, 8b). Out of the four ports, port A is connected to the opening chamber (5) of the hydraulic cylinder (3), port B is connected to the closing chamber (4) of the hydraulic cylinder (3), port P is connected to the discharge part of the hydraulic pump (1) and port R is connected to the tank (9). The operating selector valve (8) has three selective valve positions: a neutral position, a first position to which it is switched by an ON operation of the first solenoid (8a) and a second position to which it is switched by an ON operation of the second solenoid (8b). When the valve position is in the neutral position, the four ports are all in interrupted fluid communication. When the valve position is in the first position, port P is connected to port A and port B is connected to port R. When the valve position is in the second position, port P is connected to port B and port A is connected to port R.

The discharge line for the hydraulic pump (1) is connected to circuits for the other hydraulic actuators (not shown) such as a tailstock clamp and a tool post clamp to operate the other hydraulic actuators.

The operations of the two solenoids (8a, 8b) of the operating selector valve (8) and the motor (2) are controlled by a controller (12). The controller (12) receives output signals of a pressure sensor (13) for detecting the pressure of the discharge line for the hydraulic pump (1). Reference numeral (15) denotes a main machine control panel for controlling the machine tool. A spindle selection signal for giving an instruction to actuate the chuck is input from the main machine control panel (15) to the controller (12).

A description is given of the operation of the controller (12) controlling the adjustable speed motor (2) to allow the chuck to chuck a work with reference to FIG. 1. This control operation relates to an embodiment of a method for controlling a hydraulic unit of the present invention and starts upon receipt of an instruction to actuate the chuck from the main machine control panel (15). First, in step S1, a switching instruction is issued to one of the solenoids (8a, 8b) of the operating selector valve (8) to change the selector valve (8) from its neutral position to either one of the first and second positions and reset a stroke counter for the cylinder (3), i.e., a counter for integrating the number of pulses given from the encoder built in the motor (2). Next, in step S2, it is determined whether a work data flag is ON or OFF. The work data flag is for determining the existence or absence of a change in the operating stroke of the cylinder (3) involved in a change of work type. When the work type is changed to change the stroke of the cylinder (3) for chucking, the flag is turned ON according to an instruction from the main machine.

Where a work is chucked for the first time, it is determined in step S2 that the flag is ON. In this case, a teaching movement processing is carried out in steps S3 to S7. In the teaching movement, in step S3, the motor (2) is first rotated at a preset rotational speed for stroke teaching to move the cylinder (3) to allow the chuck to chuck the work (impart a teaching movement to the cylinder (3)). This movement of the cylinder (3) is for teaching, the rotational speed for stroke teaching is a fixed rotational speed and a low speed is normally employed as the rotational speed (see (I) in FIG. 3). In order to promptly carry out the teaching to shorten the period of time taken to reach the next surgeless movement (an actual chucking movement) and speed up the general operating speed of the cylinder (3), the rotational speed for stroke teaching may be set at a high speed.

After step S3, the control proceeds to step S4 and integrates the number of pulses given from the encoder built in the motor (2) to count the operating stroke of the cylinder (3). Next, in step S5, it is determined whether the discharge line pressure detected by the pressure sensor (13) is increased up to a predetermined value. This determination is to determine, after the movement of the cylinder (3) ends with the chucking of the work by the chuck, whether this has caused an increase in the pressure of the discharge line. If the determination is NO, the control returns to step S3 and continues to count the operating stroke. If the determination is YES, the control proceeds to step S6 and records the stroke corresponding to the number of pulses integrated up to that time in step S4 as a necessary stroke for chucking a current work. Thus, the operating stroke of the cylinder (3) is obtained based on the number of rotations of the motor (2) (the integrated number of pulses). Next, in step S7, because of the end of the teaching movement, the work data flag is turned OFF and, then, the actuation is ended.

If, in the above manner, the work is chucked for the first time and the teaching movement processing in step S3 to S7 ends, the work data flag is turned OFF. Therefore, the next determination in step S2 is that the work data flag is OFF. In this case, a surgeless movement processing is carried out in steps S8 to S12. The surgeless movement is for allowing the chuck to actually chuck the work. First, in step S8, the motor (2) is rotated at a preset rotational speed for movement. The rotational speed for movement refers to a first speed in the present invention and is set at a high rotational speed (see (II) in FIG. 3) in order to increase the operating speed of the cylinder (3).

Next, in step S9, as in step S4, the number of pulses from the encoder built in the motor (2) is integrated to count the operating stroke of the cylinder (3). Next, in step S10, it is determined from the integrated number of pulses whether the operating stroke of the cylinder (3) has reached a deceleration start point (deceleration point). The deceleration start point is determined by previously setting the deceleration period (for example, at 0.1 seconds) and determining how many number of pulses it takes to complete the deceleration so that the cylinder (3) can reach in the deceleration period an movement end position obtained from the necessary stroke for chucking the current work recorded in step S6. As the rotational speed for movement is higher, the deceleration start point is set farther away from the movement end position. If the operating stroke of the cylinder (3) does not reach the deceleration start point and, therefore, the determination in step S10 is NO, the control returns to step S8, continues the rotation of the motor (2) at the rotational speed for movement to move the cylinder (3) and continues to count the stroke.

On the other hand, if the deceleration start point is reached and the determination in step S10 is YES, a deceleration processing is carried out in step S11 with a time constant based the preset deceleration period to rotate the motor (2) at a rotational speed for deceleration in order to decelerate the movement of the cylinder (3) until its end. The rotational speed for deceleration refers to a second speed in the present invention and is set at an extremely low rotational speed lower than the rotational speed for movement (and the rotational speed for stroke teaching) (see (III) in FIG. 3). Thereafter, the control proceeds to step S12 and, as in step S5, determines whether the discharge line pressure detected by the pressure sensor (13) is increased up to a predetermined value. If the determination is NO, the chuck has not yet chucked the work and the operating stroke of the cylinder (3) is not completed. Therefore, the control returns to step S11 and continues the deceleration processing. On the other hand, if the determination in step S12 is YES, it is determined that the chuck has chucked the work and the operating stroke of the cylinder (3) is completed. Then, the actuation is ended.

To sum up, through the control from steps S1 to S12, the controller (12) imparts, upon the cylinder (3) actuating the chuck, a teaching movement to the cylinder (3) to determine the operating stroke of the cylinder (3) through the movement thereof based on the number of rotations of the motor (2) (the integrated number of pulses) and, during a subsequent surgeless movement of the cylinder (3) to actually actuate the chuck, rotates the motor (2) at the rotational speed for movement (first speed) until the deceleration start point just short of the end of movement of the cylinder (3) within the determined operating stroke and then rotates the motor (2) at the rotational speed for deceleration (second speed) lower than the rotational speed for movement from the deceleration start point to the end of movement of the cylinder (3).

Further, in steps S5 and S12, the controller (12) determines the operating stroke of the cylinder (3) by whether the discharge line pressure has changed and increased up to the predetermined value.

Furthermore, in steps S1 to S7, the controller (12) constitutes an estimating means for, upon the cylinder (3) actuating the chuck, estimating the operating stroke based on the number of rotations of the motor (2) (the integrated number of pulses).

Operational Behavior

A description is given of the operational behavior of the hydraulic unit (A). When an instruction signal for actuating the chuck is input from the main machine control panel (15) to the controller (12) of the hydraulic unit (A), a switching instruction is output to one of the solenoids (8a, 8b) of the operating selector valve (8) so that the selector valve (8) is switched from its neutral position to the either one of the first and second positions. Also, the counter for integrating the number of pulses from the encoder built in the motor (2) is reset.

Where the chuck chucks a current work for the first time, a teaching movement is first imparted to the cylinder (3): the motor (2) is rotated at the rotational speed for stroke teaching so that the cylinder (3) moves to allow the chuck to chuck the work. With the rotation of the motor (2), the number of pulses from the encoder built in the motor (2) is integrated so that the operating stroke of the cylinder (3) is counted. Then, when the discharge line pressure detected by the pressure sensor (13) is increased up to the predetermined value, the stroke corresponding to the number of pulses integrated up to that time is recorded as a necessary stroke for chucking the current work and the operating stroke of the cylinder (3) is determined based on the number of rotations of the motor (2) (the integrated number of pulses).

When the teaching movement ends, a normal operation is subsequently carried out in which the chuck chucks the work and the work is subjected to machining or other processes. First, the motor (2) is rotated at a high rotational speed for movement to move the cylinder (3). During the time, as during the teaching movement, the number of pulses from the encoder built in the motor (2) is integrated so that the operating stroke of the cylinder (3) is counted. Then, when the operating stroke of the cylinder (3) reaches the deceleration start point, the motor (2) is rotated at a low rotational speed for deceleration to decelerate the movement of the cylinder (3). Thereafter, when the chuck chucks the work so that the cylinder (3) comes into the movement end position, the discharge line pressure detected by the pressure sensor (13) increases up to the predetermined value. Therefore, the operating stroke of the cylinder (3) is completed so that the chuck has chucked the work. Then, the work is processed by the main machine as it is chucked by the chuck.

The teaching movement is imparted once each time the work type changes.

Effects of Embodiment

Figure 3:
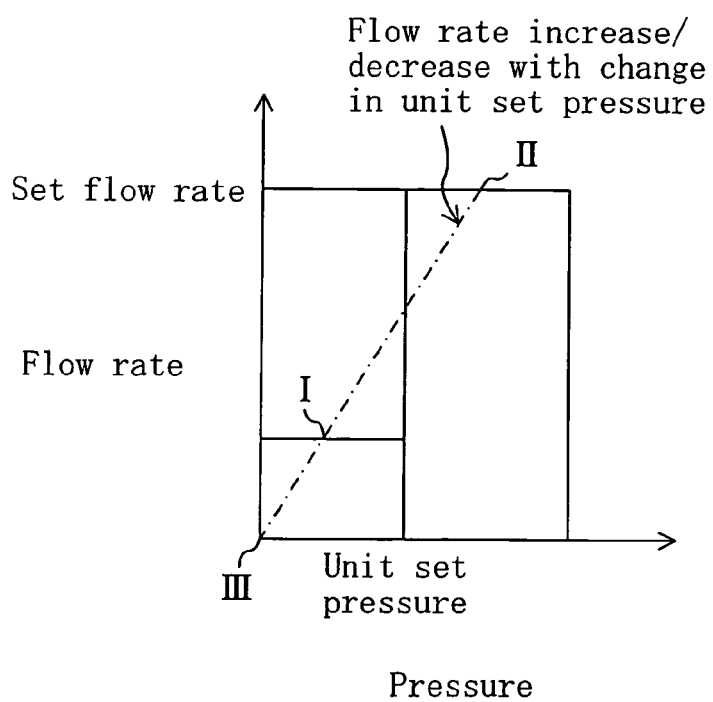
FIG. 3 is a graph showing the relation between hydraulic pressure and flow rate during movement of a cylinder.

According to the above embodiment, where the chuck chucks a new work by the action of the cylinder (3), a teaching movement is first imparted to the cylinder (3) to record the operating stroke of the cylinder (3). Then, during the actual chucking of the chuck, the deceleration start point is set based on the operating stroke of the cylinder (3) obtained by the teaching movement. When the cylinder (3) reaches the deceleration start point, the movement of the cylinder (3) is decelerated. Therefore, during the teaching movement, as shown in FIG. 3, the set flow rate is reduced down to the flow rate (I) with the unit set pressure kept constant, whereby the motor rotational speed necessary to move the cylinder (3) is set at the rotational speed for stroke teaching. During the later actual chucking movement, the unit set pressure is increased to move the cylinder (3) at the set flow rate (II). Then, the cylinder (3) is decelerated from the deceleration start point to the end of the movement. At the time when the chuck actually chucks the work, the unit set pressure is set at a state that the flow rate is substantially zero (III), thereby enabling the chuck to chuck the work with a soft touch. This reduces the development of a surge pressure involved in chucking.

Further, since the movement of the cylinder (3) is decelerated at the deceleration start point short of the end of the movement, the motor (2) can be rotated at a high rotational speed for movement to move the cylinder (3) at a high speed, which correspondingly shortens the operating time of the cylinder (3).

Figure 4:
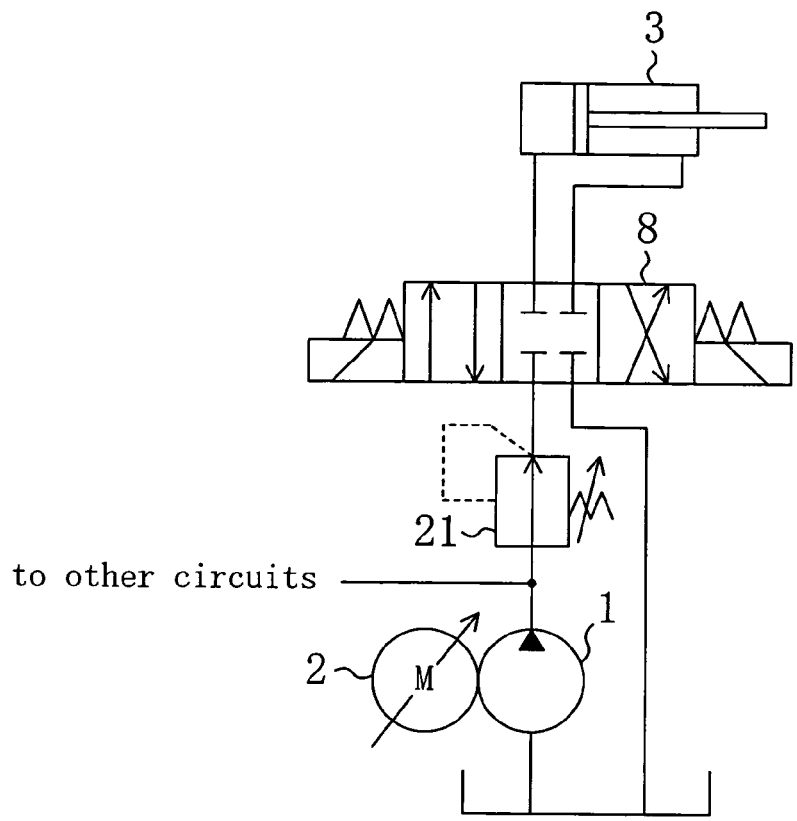
FIG. 4 is a corresponding view of FIG. 2, showing a known art.
Figure 5:
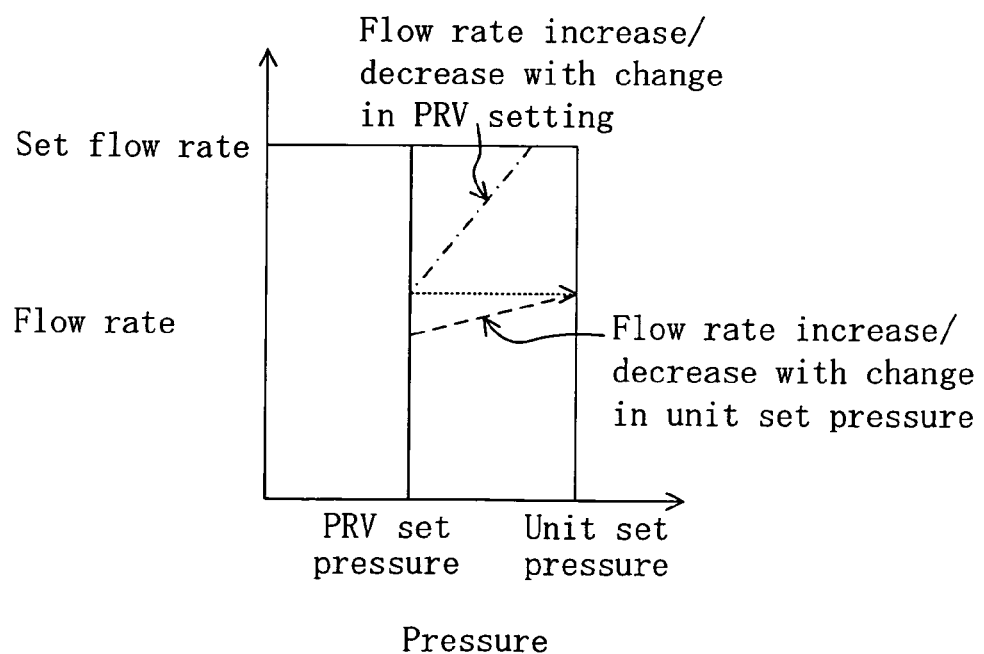
FIG. 5 is a corresponding view of FIG. 3, showing the known art.
Figure 6:
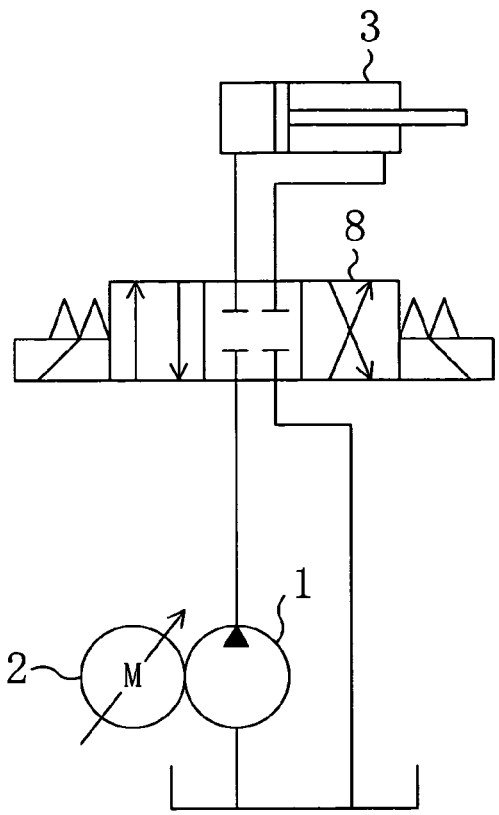
FIG. 6 is a corresponding view of FIG. 2, showing another known art.
Figure 7:
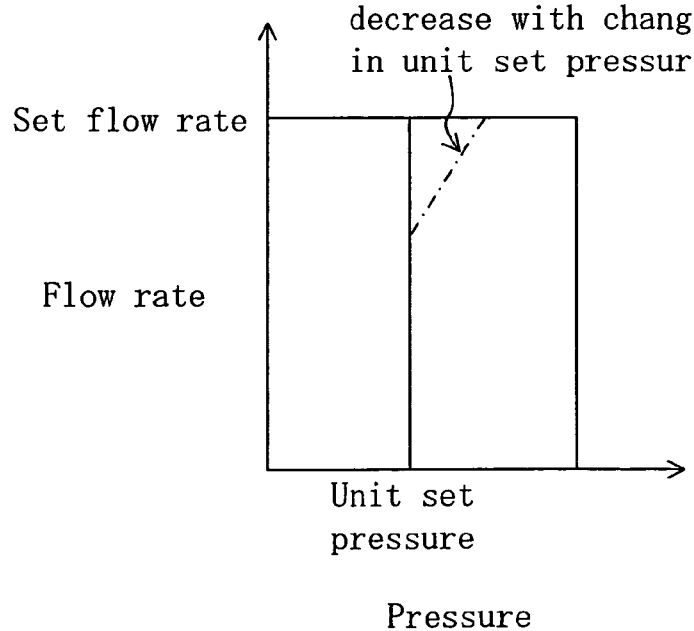
FIG. 7 is a corresponding view of FIG. 3, showing said another known art.

Therefore, rapid movement of the cylinder (3) and reduction in the surge pressure can be concurrently provided. For example, as compared with the known art shown in FIG. 4, the cylinder operating time can be shortened 30% to 50% and the surge pressure can be reduced down to 0.1 MPa or less.

The teaching movement is imparted not only to the cylinder (3) for actuating the chuck but also to the actuator for actuating a tailstock clamp and the actuator for actuating a tool post clamp. Thus, a multi-spindle surgeless control can be exercised in the machining tool.

Further, since the fixed displacement hydraulic pump (1) is combined with the adjustable speed motor (2) and the operating stroke of the cylinder (3) is recorded by integrating the number of pulses from the rotational speed control encoder in the adjustable speed motor (2) through the teaching movement, the operating stroke of the cylinder (3) can be easily estimated based on the number of rotations of the motor (2) (the integrated number of pulses).

Other Embodiments

The present invention is not limited to the above embodiment and includes the following other embodiments.

(1) For example, though in the above embodiment the operating stroke of the cylinder (3) is determined from a change towards an increase in the discharge line pressure for both the teaching movement and the surgeless movement (actual chucking movement), it may be determined instead from a change towards an increase in the drive current of the motor (2).

(2) In the above embodiment, upon change of the work type, even if the work is one for which the operating stroke of the cylinder (3) has been recorded through a previous teaching movement, a teaching movement is imparted again to the cylinder (3) to record the operating stroke of the cylinder (3). Instead of this, the operating stroke of the cylinder (3) recorded by the previous teaching movement processing may be stored for every work type and, at every change of the work type, the operating stroke of the hydraulic cylinder (3) for a current work may be called up to control the cylinder (3) based on the operating stroke. Thus, no further teaching is required as regarding works for which the operating strokes of the cylinder (3) have been stored, thereby further shortening the operating time of the cylinder (3).

(3) Further, in the above embodiment, the operating stroke of the cylinder (3) is recorded through a teaching movement for a work and the recorded stroke is used during actual process of the work. Instead of such a teaching movement, the operating stroke of the cylinder (3) may be leaning controlled. For example, during the hydraulic cylinder (3) actuating the chuck, as in the above embodiment, the motor (2) is rotated at the rotational speed for movement (first speed) until the deceleration start point short of the end of movement of the cylinder (3) within the predetermined operating stroke and then rotated at the rotational speed for deceleration (second speed) lower than the rotational speed for movement from the deceleration start point to the end of movement of the cylinder (3). Then, unlike the above embodiment, the controller (12) corrects the operating stroke of the cylinder (3) based on the surge pressure at the end of movement of the cylinder (3) and the period of time from the deceleration start point to the end of movement of the cylinder (3). Specifically, if the surge pressure at the end of movement of the cylinder (3) is equal to or greater than a set value, the operating stroke of the cylinder (3) is corrected to a small extent. Alternatively, if the period of time from the deceleration start point to the end of movement is equal to or greater than a set value, the operating stroke of the cylinder (3) is corrected to a large extent. Thus, without imparting of a teaching movement to the cylinder (3), rapid movement of the cylinder (3) and reduction in the surge pressure can be concurrently provided. Also in this case, like the above case (2), the operating stroke of the cylinder (3) may be recorded for every work type and, at every change of the work type, the data for a current work may be called up to control the cylinder (3) based on the data.

(4) Furthermore, in the case (3), if the operating stroke of the cylinder (3) is smaller or greater than the predetermined range, the controller (12) may issue a warning. Thus, it can be easily recognized that the operating stroke has exceeded the predetermined range.

(5) Though in the above embodiment the hydraulic cylinder (3) is used, any hydraulic actuator other than the hydraulic cylinder (3) may be used. Further, the present invention may be applied to systems other than machining tools and to fluid pressure units using fluids other than operating oil.

INDUSTRIAL APPLICABILITY

As seen from the above description, the present invention is useful for fluid pressure units equipped with a fixed displacement fluid pump driven by an adjustable speed motor and an actuator for actuating an object to be actuated, because it concurrently provides rapid movement of the actuator and reduction in surge pressure.

The invention claimed is:

1. A fluid pressure unit comprising:
a fixed displacement fluid pump configured to be driven by an adjustable speed motor to discharge fluid;
at least one actuator for actuating an object to be actuated with a pressure of the fluid discharged from the fluid pump; and
a controller for, upon the actuator actuating the object to be actuated, imparting a teaching movement to the actuator to determine an operating range of the actuator based on the number of rotations of the motor and, during subsequent movement of the actuator to actuate the object to be actuated, rotating the motor at a first speed until a preset deceleration start point short of the end of movement of the actuator within the determined operating range and then rotating the motor at a second speed lower than the first speed from the deceleration start point to the end of movement of the actuator.

2. A fluid pressure unit comprising:
a fixed displacement fluid pump configured to be driven by an adjustable speed motor to discharge fluid;
at least one actuator for actuating an object to be actuated with a pressure of the fluid discharged from the fluid pump;
a controller for, upon the actuator actuating the object to be actuated, rotating the motor at a first speed until a preset deceleration start point short of the end of movement of the actuator within a predetermined operating range of the actuator and then rotating the motor at a second speed lower than the first speed from the deceleration start point to the end of movement of the actuator; and
the controller being configured to effect a learning control for correcting the operating range of the actuator to a small extent when the surge pressure at the end of movement of the actuator is equal to or greater than a set value and correcting the operating range of the actuator to a large extent when the period of time from the deceleration start point to the end of movement of the actuator is equal to or greater than a set value.

3. The fluid pressure unit of claim 1 or 2, wherein
the object to be actuated is a chuck for chucking a work, and
the controller control means is configured to store data on the operating range of the actuator for each of plural types of works and, at every change of the work type, call up the operating range of the actuator for the current work and control the actuator based on the operating range.

4. The fluid pressure unit of claim 2, wherein the controller is configured to issue a warning when the operating range of the actuator is smaller or greater than the predetermined operating range.

5. The fluid pressure unit of claim 1 or 2, wherein the at least one actuator comprises a plurality of actuators.

6. The fluid pressure unit of claim 1 or 2, wherein the controller determines the operating range of the actuator from a change towards an increase in the fluid pressure.

7. The fluid pressure unit of claim 1 or 2, wherein the controller determines the operating range of the actuator from a change towards an increase in the drive current of the motor.

8. A fluid pressure unit comprising:
a fixed displacement fluid pump configured to be driven by an adjustable speed motor to discharge fluid;
an actuator for actuating an object to be actuated with a pressure of the fluid discharged from the fluid pump; and
estimating means for, upon the actuator actuating the object to be actuated, estimating an operating range of the actuator based on the number of rotations of the motor.

9. A method for controlling a fluid pressure unit including a fixed displacement fluid pump configured to be driven by an adjustable speed motor to discharge fluid and at least one actuator for actuating an object to be actuated with a pressure of the fluid discharged from the fluid pump, the method comprising:
upon the actuator actuating the object to be actuated, imparting a teaching movement to the actuator to determine an operating range of the actuator based on the number of rotations of the motor; and
during subsequent movement of the actuator to actuate the object to be actuated, rotating the motor at a first speed until a preset deceleration start point short of the end of movement of the actuator within the determined operating range and then rotating the motor at a second speed lower than the first speed from the deceleration start point to the end of movement of the actuator.

10. A method for controlling a fluid pressure unit including a fixed displacement fluid pump configured to be driven by an adjustable speed motor to discharge fluid and at least one actuator for actuating an object to be actuated with a pressure of the fluid discharged from the fluid pump, the method comprising:
upon the actuator actuating the object to be actuated, rotating the motor at a first speed until a preset deceleration start point short of the end of movement of the actuator within a predetermined operating range of the actuator and then rotating the motor at a second speed lower than the first speed from the deceleration start point to the end of movement of the actuator; and correcting the operating range of the actuator to a small extent when the surge pressure at the end of movement of the actuator is equal to or greater than a set value and correcting the operating range of the actuator to a large extent when the period of time from the deceleration start point to the end of movement of the actuator is equal to or greater than a set value.

* * * * *